United States Patent [19]

Veit et al.

[11] Patent Number: 4,679,723

[45] Date of Patent: Jul. 14, 1987

[54] METHOD OF SOLDERING THE OUTER SLEEVE OF A COAXIAL CABLE CONNECTOR TO A HOUSING

[75] Inventors: Ernst-Ludwig Veit, Solms; Jürgen Klee, Braunfels, both of Fed. Rep. of Germany

[73] Assignee: U.S. Philips Corporation, New York, N.Y.

[21] Appl. No.: 922,823

[22] Filed: Oct. 22, 1986

Related U.S. Application Data

[63] Continuation of Ser. No. 828,117, Feb. 10, 1986, abandoned.

[30] Foreign Application Priority Data

Feb. 19, 1985 [DE] Fed. Rep. of Germany ....... 3505616

[51] Int. Cl.$^4$ .............................................. B23K 31/02

[52] U.S. Cl. .................................. 228/168; 228/179; 228/173.6; 29/828; 439/874

[58] Field of Search ..................... 228/173.6, 168, 247, 228/169, 179; 29/828; 339/275 B, 275 R, 17 C

[56] References Cited

U.S. PATENT DOCUMENTS

| | | | |
|---|---|---|---|
| 235,834 | 12/1880 | White | 228/169 |
| 3,121,771 | 2/1964 | Stearns | 339/17 C |
| 3,932,934 | 1/1976 | Lynch et al. | 29/628 |
| 4,068,436 | 1/1978 | Sato | 228/168 |

*Primary Examiner*—Nicholas P. Godici
*Assistant Examiner*—Karen Skillman
*Attorney, Agent, or Firm*—David R. Treacy

[57] ABSTRACT

The outer conducting sleeve of a coaxial cable connector is soldered to a housing wall or metal plate, the sleeve being butt-mounted to the plate. The plate has a raised edge surrounding the opening, and a ring of solder is placed between the raised edge and the inner surface of the sleeve before the sleeve is butted against the plate, and the solder is subsequently melted. Indentations in the plate, under the end wall of the sleeve, permit solder to flow outward so as to wet the outer surface of the sleeve to form a continuous joint.

9 Claims, 2 Drawing Figures

METHOD OF SOLDERING THE OUTER SLEEVE OF A COAXIAL CABLE CONNECTOR TO A HOUSING

This is a continuation of application Ser. No. 828,117, filed Feb. 10, 1986, now abandoned.

BACKGROUND OF THE INVENTION

The invention relates to a method of soldering the outer conductor sleeve of a coaxial cable socket or plug to a metal plate 1 such as a housing, the sleeve being butt-mounted on the metal plate.

The outer conductor contact sleeves of coaxial sockets or coaxial plugs must have a good metal contact all around with a grounded housing or plate in order to obtain sufficient protection against interference. In order to achieve this, the outer conductor contact sleeves of coaxial sockets or coaxial plugs are generally mounted by soldering manually, the person carrying out the soldering using a soldering iron to melt the solder around the contact sleeve. This requires soldering with a high level of technical expertise.

It is also known, for example from German Gebrauchsmuster No. 19 59 172, for the outer conductor contact sleeve to be provided with a flange which can be held against the edge of an opening in a metal housing to form a coaxial feedthrough connection. This flange is then soldered to the edge of the metal housing. This case also requires care in soldering around the rim, since an increased bearing surface of the sleeve flange does not, of itself, improve the soldering conditions.

SUMMARY OF THE INVENTION

The object of the invention is to enable soldering outer conductor contact sleeves onto a metal housing in such a way that applying and moving a soldering iron all the way around a soldering seam becomes superfluous. It should be sufficient to raise the soldering zone to soldering temperature.

This object is achieved according to the invention by applying a ring of wire solder around a raised edge of the opening, on the side to which the connection is to be made. The contact sleeve is then applied over the ring of wire solder onto the metal plate, and the ring subsequently is melted by heating.

Through the insertion of a ring of wire solder and the raising of the edge of the opening, the soldering point is moved to the inner edge of the contact sleeve. The flux and the solder must flow against the contact sleeve. In this way the sleeve edge and the edge of the opening are soldered together uniformly and continuously with a high degree of reliability. The use of a soldering iron is rendered superfluous.

In a preferred embodiment of the invention the melting solder flows through radial indentations in the metal plate under the end of the contact sleeve which is to be mounted on the metal plate, to ensure all-round external soldering of the edge with the metal plate. The solder thus partially flows outwards under the soldering seam and then solders continuously round the edge of the opening, to wet the outer conductor contact sleeve also from the outside. It is characteristic of the resulting contact joint that the metal plate is provided with indentations angularly spaced along the mounting area of the contact sleeve, thus extending the mounting surface of the contact sleeve from the inside to the outside. The edge of the opening is raised in a smoothly curved manner, like a spout formed in a sheet metal wall, inside the mounting area of the contact sleeve. The mounting edge and the metal plate are joined together in the mounting area by means of the solder.

The method according to the invention is detailed further with reference to the embodiment shown in the drawing.

DESCRIPTION OF THE PREFERRED EMBODIMENT

Figure 1:
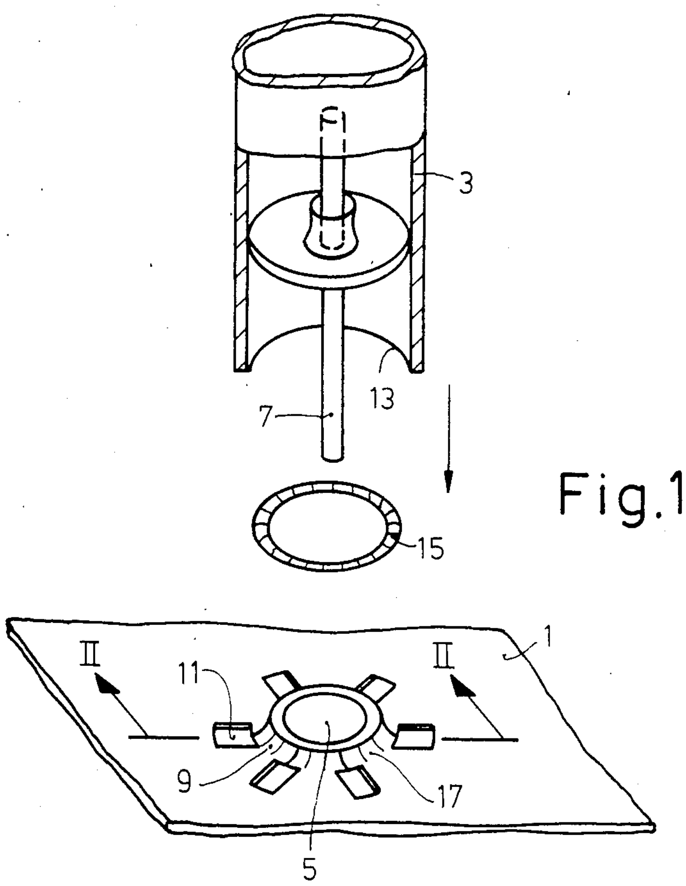
FIG. 1 shows diagrammatically in exploded view the parts used in the method of soldering of an outer conductor contact sleeve of a coaxial connector onto a housing opening.
Figure 2:
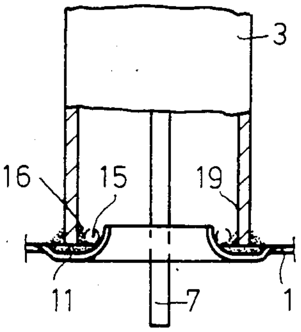
FIG. 2 is a longitudinal sectional view of the assembled parts after fitting together and soldering.

A metal housing having a generally planar wall 1, for example made of tin plate, is prepared for soldering of a coaxial connection in the form of a coaxial connecting plug or socket 3, by forming an opening 5 through which the neutral conductor 7 of the coaxial socket 3 is to be fed into the inside of the housing.

The portion 9 of the wall 1, around the edge of the opening 5, is raised with a smoothly curved outer surface as shown in the longitudinal section· Around the portion 9, angularly spaced indentations 11 are arranged in the planar wall 1, in a radial pattern. The contact sleeve 3 has a lower mounting edge 13, with which it can be butt-mounted on the metal housing 1 around the opening 5.

The joining of the contact sleeve 3 with the metal housing 1 now proceeds by first placing a ring of wire solder 15 having an outer diameter less than the inside diameter of the sleeve 3, around the wall portion 9 surrounding the opening 5 in the metal housing. The contact sleeve 3 is then placed on the wall 1, with its mounting edge 13, abutting the spaces 17 being the indentations 11, and surrounding the wall portion 9 and solder ring 15. Thus the mounting edge 13 has a certain distance from the plate in the area of the indentations. The ring of wire solder 15 thereby lies in a trough 16 between the contact sleeve 3 and the outer surface of the wall portion 9. After mounting, the metal housing 1 is heated around the contact sleeve 3 to the melting temperature of the wire solder ring 15. The melting solder at the smoothly curved surface surrounging the opening 5 thereby flows to the inside 19 of the contact sleeve 3. The solder also flows underneath the mounting edge 13 in the area of the indentations 11. In this manner a continuous soldered seam is achieved between the contact sleeve 3 and the housing plate 1.

What is claimed is:

1. A method of soldering a metallic sleeve to a metal plate, around an opening in the plate, comprising forming a raised wall portion around the opening in the plate, so as to form a raised edge of the opening, placing a ring of wire solder around said wall portion, placing a sleeve, having a mounting surface at an end of the sleeve, with said mounting surface abutting the plate, such that the sleeve surrounds said ring of solder and the solder is disposed in a trough defined by the sleeve, the plate, and the raised wall portion, and then melting said solder by heating it, and then permitting it to cool and solidify, thereby soldering said sleeve to said plate.

2. A method as claimed in claim 1, characterized in that, at least in a region surrounding said raised wall portion, said plate is generally planar; and the method additionally comprises the step of forming angularly spaced, radially extending indentations in said plate, under said mounting surface, thereby permitting said solder to flow through said indentations while it is molten, to ensure all-round external soldering of the sleeve to the plate.

3. A method as claimed in claim 2, characterized in that said wall portion of the plate is raised so as to have a smoothly curved outer surface.

4. A method of soldering an outer conductor sleeve of a coaxial cable connector around an opening in a metal plate, comprising the steps of forming a raised wall portion around the opening in the plate, so as to form a raised edge of the opening, placing a ring of wire solder around said wall portion, placing said outer conductor sleeve with a sleeve mounting surface abutting the plate, such that the sleeve surrounds said ring of solder and the solder is disposed in a trough defined by the sleeve, the plate, and the raised portion, and then melting said solder by heating it, and then permitting it to cool and solidify, thereby soldering said sleeve to said plate.

5. A method as claimed in claim 4, characterized in that, at least in a region surrounding said raised wall portion, said plate is generally planar; and the method additionally comprises the step of forming angularly spaced, radially extending indentations in said plate, under said mounting surface, thereby permitting said solder to flow through said indentations while it is molten, to ensure all-round external soldering of the sleeve to the plate.

6. A method as claimed in claim 5, characterized in that said wall portion of the plate is raised so as to have a smoothly curved outer surface.

7. A method as claimed in claim 4, characterized in that said wall portion of the plate is raised so as to have a smoothly curved outer surface.

8. The combination of an outer conductor sleeve of a coaxial connector and a metal plate, said plate having an opening therethrough through which a central conductor is passed, characterized in that said metal plate has a generally planar wall in a region around the opening, and a raised wall portion forming a raised edge of said opening, said outer sleeve has a mounting surface abutting said generally planar portion, and a given inside diameter, said planar portion has a plurality of angularly spaced, radially extending indentations formed therein, disposed under said mounting surface, said raised wall portion has an outer diameter less than said inside diameter of said sleeve, such that said raised edge is spaced from said sleeve, and said sleeve and metal plate are joined together by solder along at least the entire inner periphery of said mounting surface of the sleeve.

9. A combination as claimed in claim 8, characterized in that said raised edge is raised in a smoothly curved manner, shaped like a spout.

* * * * *